United States Patent [19]
Allen

[11] Patent Number: 5,732,652
[45] Date of Patent: Mar. 31, 1998

[54] APPARATUS AND METHOD FOR DISPENSING FLOWABLE MATERIAL

[76] Inventor: Peter William Allen, Down Farm, Didcot, Oxon, OX11 1DJ, United Kingdom

[21] Appl. No.: 446,448

[22] Filed: May 22, 1995

[51] Int. Cl.[6] .................................................. A01K 5/02
[52] U.S. Cl. .............................................. 119/57.91
[58] Field of Search .................... 119/57.91, 57.92, 119/57.5, 57.6, 57.1; 239/681, 687, 688

[56] References Cited

U.S. PATENT DOCUMENTS

| | | | |
|---|---|---|---|
| 3,195,508 | 7/1965 | Lehman et al. | 119/57.91 |
| 3,964,681 | 6/1976 | Herd | 239/681 X |
| 4,166,581 | 9/1979 | Hetrick | 239/687 X |

FOREIGN PATENT DOCUMENTS

| | | |
|---|---|---|
| 0 244 906 A1 | 11/1987 | European Pat. Off. . |
| 0496285 A1 | 7/1992 | European Pat. Off. . |
| 2 667 217 A1 | 9/1991 | France . |
| 32 36 121 A1 | 3/1984 | Germany . |
| 720117 | 12/1954 | United Kingdom . |
| 2257884 | 1/1993 | United Kingdom . |
| 2263219 | 7/1993 | United Kingdom . |

*Primary Examiner*—Thomas Price
*Attorney, Agent, or Firm*—Wood, Phillips, VanSanten, Clark & Mortimer

[57] ABSTRACT

The invention relates to apparatus for dispensing flowable material such as pig feed nuts, comprising a container or hopper for the material, a metering dispenser for delivering a metered amount of the material from an outlet (not shown) of the container, and an ejector having an inlet for receiving the metered material substantially centrally thereof and an outlet spaced from the inlet through which the metered material is ejected from the apparatus to a desired location, such as a field or enclosure in which pigs are kept in a free-range environment.

12 Claims, 4 Drawing Sheets

APPARATUS AND METHOD FOR DISPENSING FLOWABLE MATERIAL

The invention relates to an apparatus and a method, particularly for dispensing metered, that is desired, amounts of a flowable material such as animal feed in the form of discrete nuts or pellets.

Such pellets are often large, for example 35 mm wide and 50 mm long, of an ovoid configuration, particularly for feeding pigs. Livestock such as pigs is often kept free range in a field or paddock, and there may be a hundred of the animals in a paddock of several acres in extent, each pig having a small sty or arch in which it can take shelter. It is thus difficult normally to distribute the required amount of feed to all the pigs in the enclosure. That is a time-consuming, and thus expensive, task.

It is accordingly an object of the invention to seek to mitigate this disadvantage.

According to a first aspect of this invention, there is provided apparatus for dispensing flowable material, comprising a container for the material, a metering dispenser for delivering a metered amount of material from an outlet of the container, an ejector having an inlet for receiving the metered material substantially centrally thereof and an outlet spaced from the inlet through which the metered material is ejected from the apparatus to a desired location, the ejector comprising a disc-like body, the outlet being peripherally arranged, and there being in the body, means with a plurality of blades, for receiving material from the central inlet and conducting it to and through the outlet.

The ejector may be removably mounted in the apparatus. This provides for ease of repair, particularly where the ejector may be slidably mounted on guide rails in the apparatus. This construction enables the ejector to be pulled clear of the container and metering dispenser for ease of access.

The ejection outlet may be inclined upwardly to the horizontal. This provides for discharge of material in an arc-like trajectory, whereby to "fire" the material over a fence for example.

The means may comprise a rotor means, preferably comprising seven blades radiating from a spindle which itself may be rotated by a motor means adapted for connection with a source of power. This provides for a relatively simple, self-contained construction, particularly where the motor means may be a hydraulic motor adapted for connection with a hydraulics system of a tractor.

The blades may be stepped to provide a cut-away part adjacent the inlet. This construction provides for a relatively unobstructed passage of material from the container through the metered outlet thereof and through the inlet to the ejector via the inlet thereof.

The ejector outlet may be tangentially arranged in a wall of the body. This provides for a controlled ejection of material to a desired location.

There may be a trajectory direction means such as a nozzle adapted for mounting at, or mounted at, the ejection outlet. This can provide for ejection in a particular desired direction.

The angle of trajectory through the outlet may also be adjustable, for example by adjustment of the angle of inclination of the ejector itself, or by adjusting the angle of the nozzle. In either case, the direction of "throw" of the material can be adjusted so, again, controlling the dispensing of the material.

The apparatus may be mounted on a chassis, particularly a mobile chassis. This construction provides for the apparatus to be drawn behind a tractor, and thus to act as a field dispenser for material such as animal feedstuff.

According to a second aspect of the invention there is provided a method of dispensing flowable material, comprising providing material, providing apparatus as hereinbefore defined, and ejecting material through the ejector outlet to a desired location.

The method may include the step of traversing the apparatus along a fence on one side thereof and ejecting the material over the fence to a desired location on the other side of the fence. This method provides for feeding animals without having to enter an enclosure in which they are held.

The step may including varying the length of ejection by varying the speed of the ejector. This is a relatively simple method of controlling the length of "throw".

Apparatus and method embodying the invention are hereinafter described, by way of example, with reference to the accompanying drawings.

Figure 1:
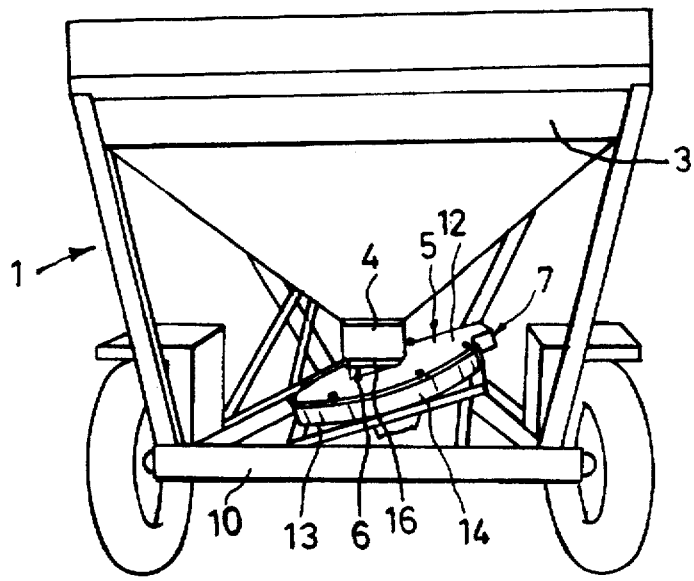
FIG. 1 is a rear view of apparatus according to the invention.
Figure 2:
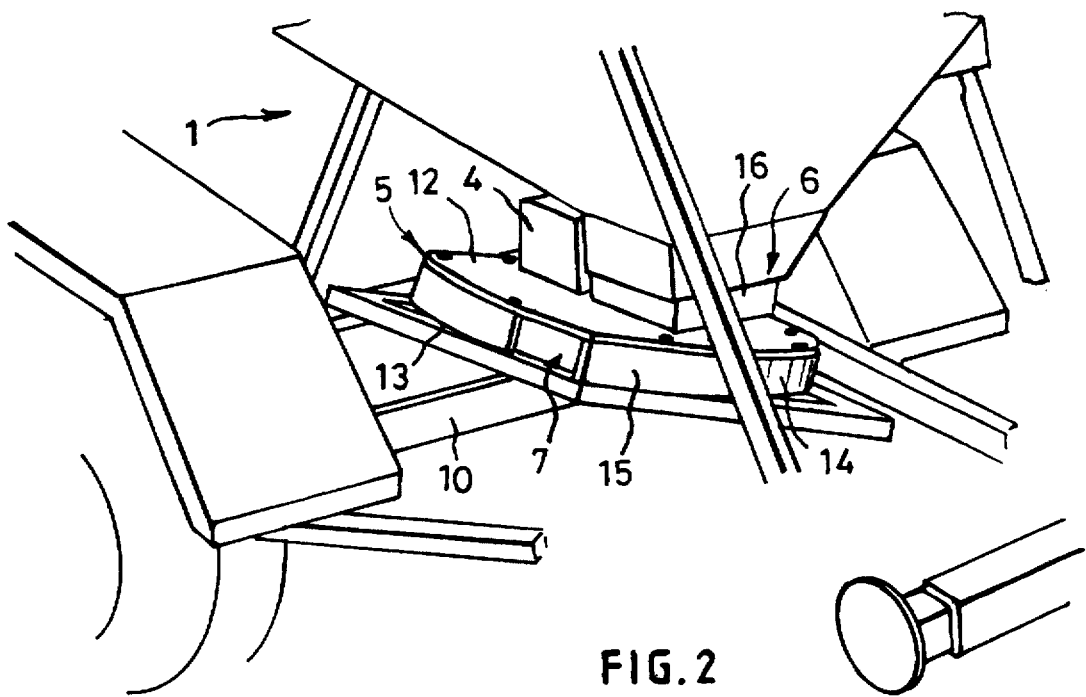
FIG. 2 is an enlarged view from one side of part of the apparatus according to FIG. 1.
Figure 3:
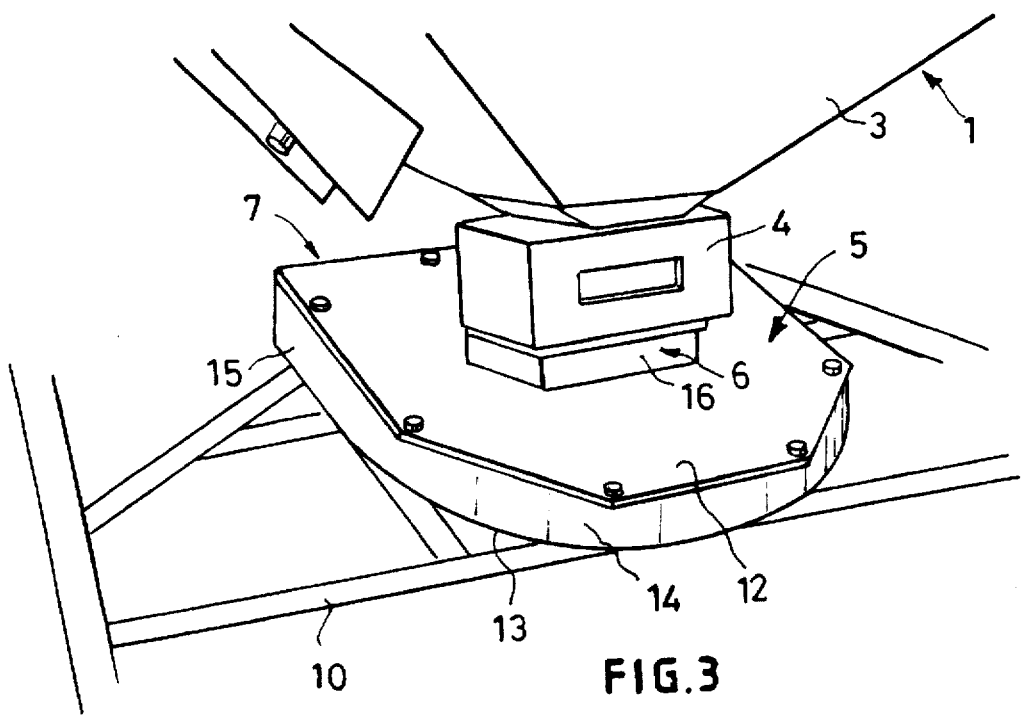
FIG. 3 is a view similar to FIG. 2, but from the other side.
Figure 4:
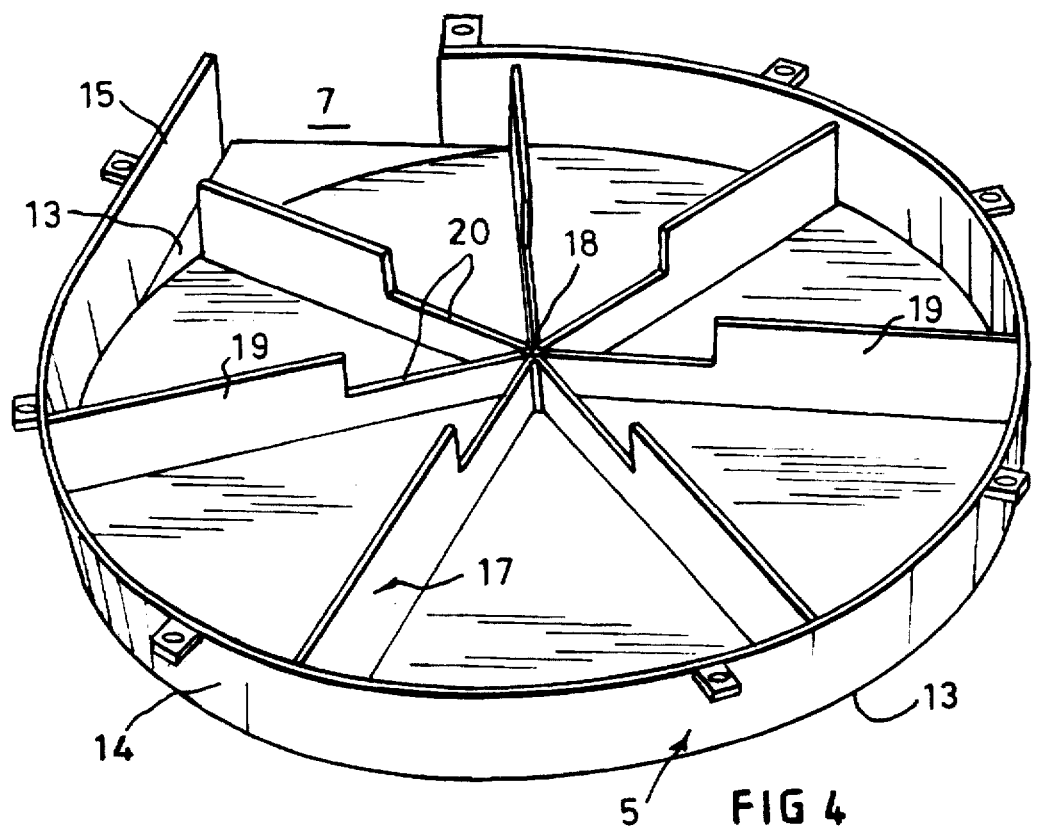
FIG. 4 is an interior view of an ejector of the apparatus of FIGS. 1 to 3, a cover of the ejector being removed to show the interior.

Referring to the drawings, there is shown apparatus 1 for dispensing flowable material such as pig feed nuts 2 (FIG. 4), comprising a container or hopper 3 for the material, a metering dispenser 4 for delivering a metered amount of the material from an outlet (not shown) of the container 3, and an ejector 5 having an inlet 6 for receiving the metered material substantially centrally thereof and an outlet 7 spaced from the inlet 6 through which the metered material 2 is ejected from the apparatus 1 to a desired location, such as a field or enclosure 8 in which pigs 9 are kept in a free-range environment.

The apparatus 1 is mounted on a mobile chassis 10 so that it can be drawn behind a tractor 11. The metering dispenser 4 is an electric dispenser at an outlet or throat of the container 1 which is essentially a pyramidal bin. The dispenser 4 comprises essentially two convergent resiliently mounted plates (not shown) between which at the convergent end is a rotatable paddle device (also not shown) which on rotation forces the plates apart to dispense a metered amount of material 2 through the outlet, the volume or weight of material being determined inter alia by the spacing between the paddles and the speed of rotation thereof.

The metered amount of material 2 enters the ejector 5 through the central inlet 6 below, as viewed, the metering dispenser 4. The ejector 5 comprises a substantially flat, or disc-like body, having an upper wall or cover 12 and a lower wall 13, the two walls being spaced apart by a peripheral wall 14 so that the ejector 5 body is substantially cylindrical. It is not purely cylindrical in the embodiment because there is in the wall 14 the outlet 7 defined by a gap in the wall and a tangential extension 15 to the wall 14 at one side of the gap 7. The wall 14 is of substantially channel section, thus providing upper and lower (in use) flanges to which the upper 12 and lower 13 walls are bolted.

Figure 7:
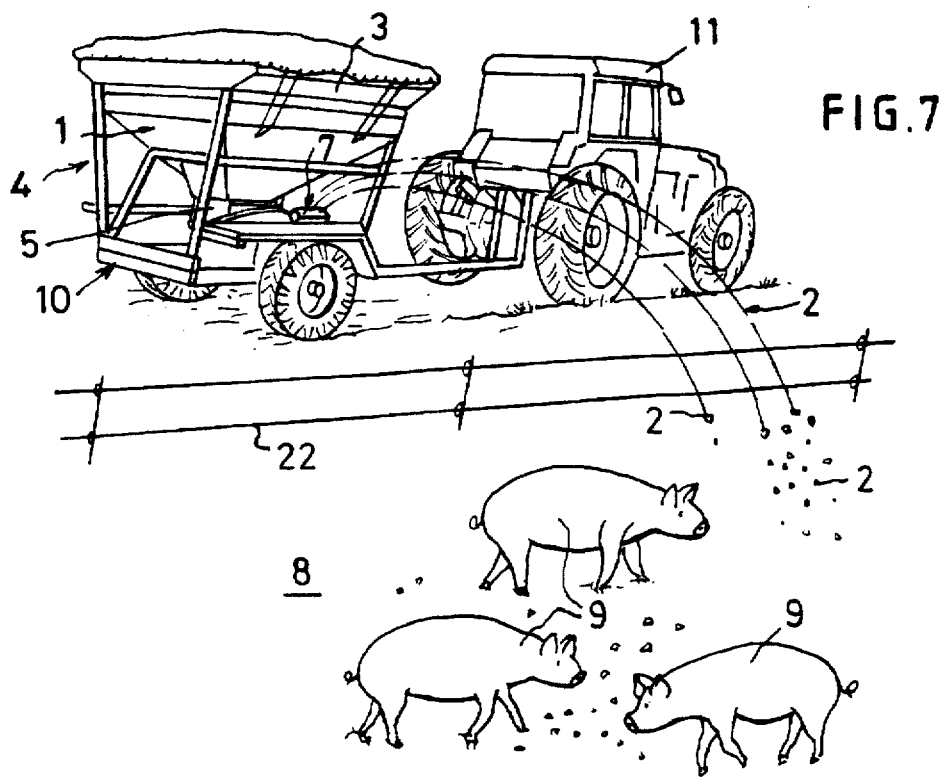
FIGS. 7 and 8 show respectively, and schematically, a perspective view and plan view of a method of animal feeding using the apparatus of FIGS. 1 to 6.
Figure 8:
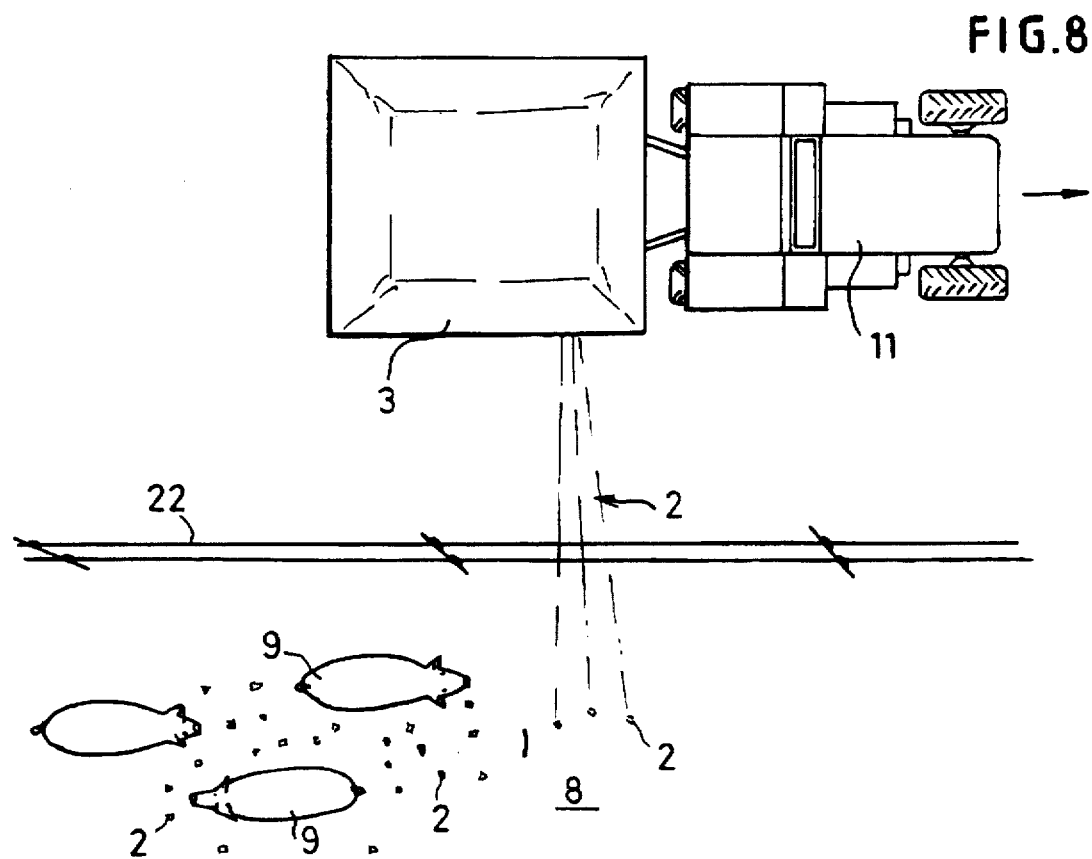

The ejector 5 is mounted in the apparatus 1 to be inclined at about 35° to the horizontal so that the outlet 7 is also so inclined, and is directed laterally of the chassis 10, and tractor 11 (FIGS. 7 and 8). Because the ejector 5 is inclined, the top wall or cover 12 is also inclined, and so is an orifice in the top wall providing the inlet 6 to the ejector. There is therefore between the metering dispenser and the inlet, a removable metal throat 16 which directs metered material to the inlet 6.

The ejector 5 has interiorly thereof a seven bladed rotor 17 mounted on a central spindle 18 (which passes through the bottom wall 13 to a hydraulic motor (not shown), which is connectable with a hydraulic system of the tractor 11.

Each blade 19 of the rotor is cut-away over a length adjacent the centre to provide a lower part 20 under the inlet 6.

Figure 5:
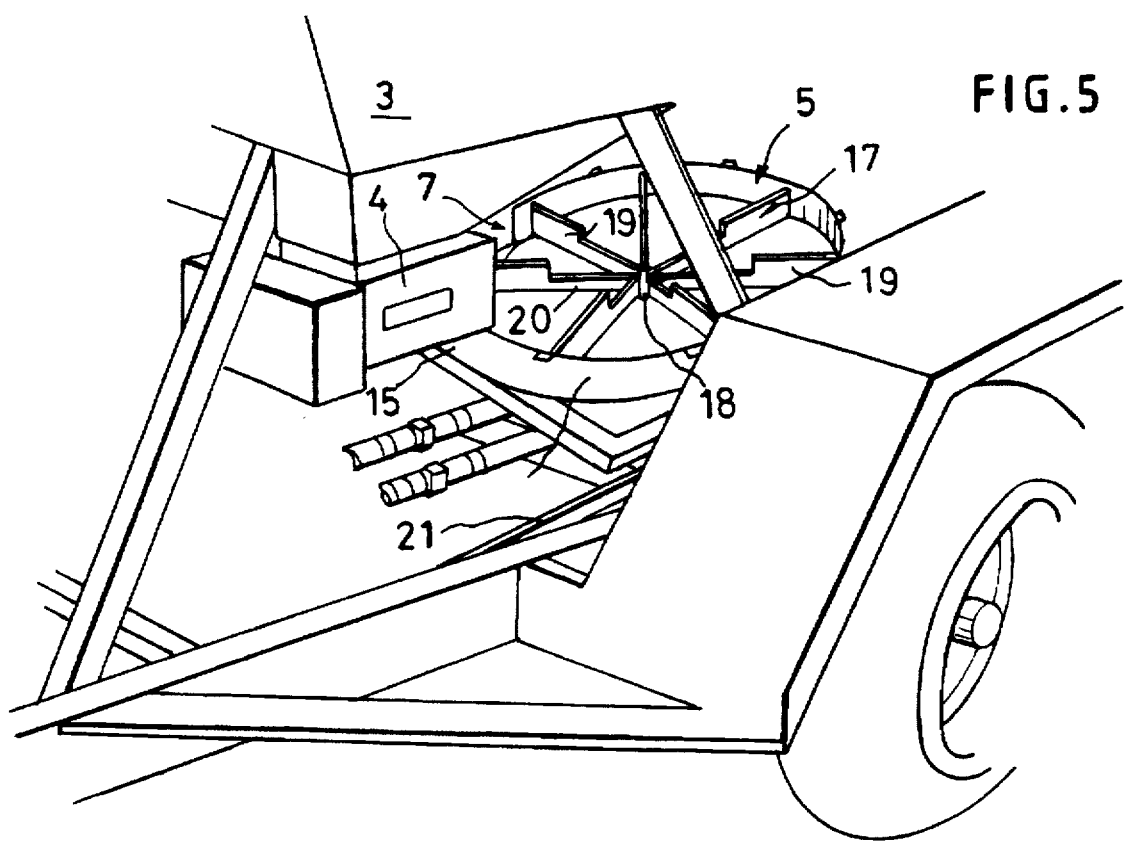
FIG. 5 shows a perspective view of a part of the apparatus of FIGS. 1 to 4, with the ejector withdrawn.
Figure 6:
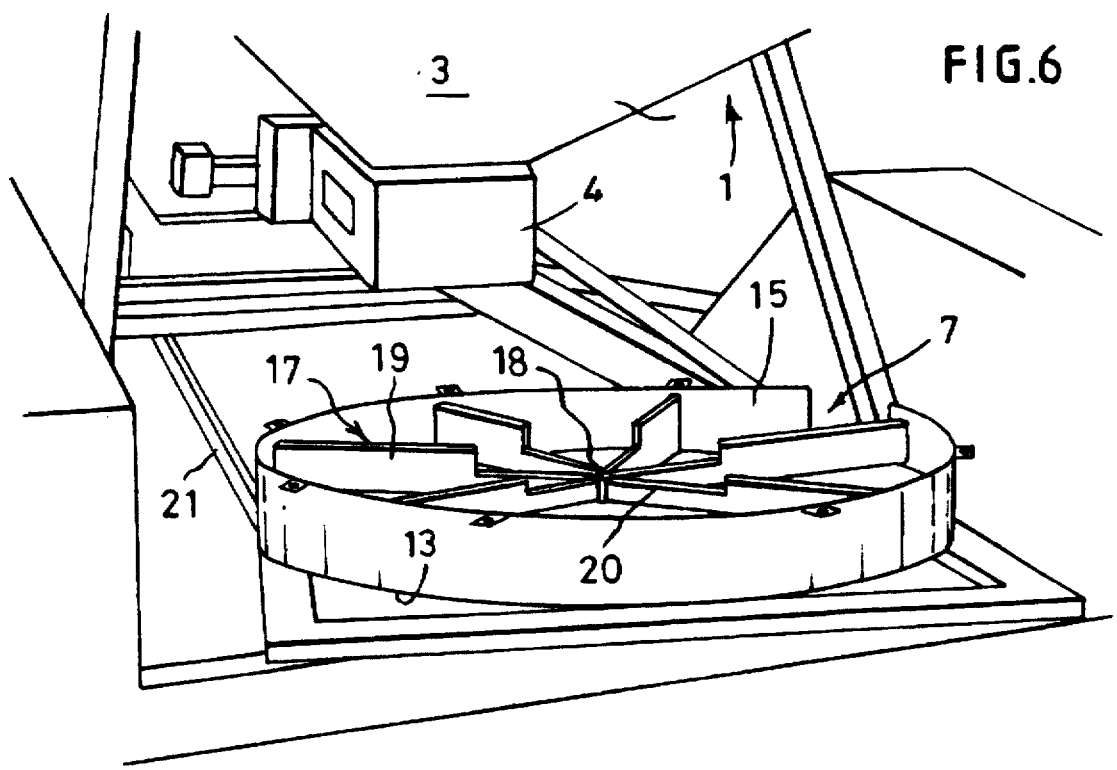
FIG. 6 shows a rear view of the apparatus with the ejector withdrawn.

The ejector 8 is mounted on guide means 21 on the chassis 10 which guide means 21 is in the embodiment in the form of guide rails on which the ejector 5 is slidably mounted so that it can be withdrawn to the rear (in use) of the chassis 10 away from the container 3 and dispenser 4 and removed for maintenance of the apparatus 1, as seen in FIGS. 5 and 6.

In use, with the ejector 5 firmly in place below the dispenser 4, with the hydraulic motor connected with the hydraulics system of the tractor 11 and the container 3 full of material such as pig nuts 2, the apparatus 1 is drawn by the tractor 11 along a fence such as an electric fence 22 on one side thereof. The nuts 2 are metered into the ejector 5 and ejected therefrom in a trajectory which takes them over the fence 22 to lay the other side thereof in the field 8 with the pigs 9, which are thereby fed automatically without having to enter the field 8. A range of 150 m can be achieved depending on the speed of the rotor 17. Also, the angle of the ejector can be adjusted to provide for a variety of trajectories and hence "throws" of the feed.

It will be understood that modifications may be possible. For example, there may be a nozzle or spout which can be removably secured to the outlet 7 of the ejector 5 to provide for a more concentrated dispersal of the feed 20. Also, the nozzle, or the outlet 7, may be so arranged that the direction of dispersal is not at 90° to the direction of travel (FIG. 8) but is at any desired angle, including substantially parallel to that direction. This is achieved in that the nozzle is adjustable fore and aft of the apparatus 1 for adjusting the direction of throw of the pig nuts 2.

There may be a extension conduit means, which may be flexible, such as a snorkel pipe to fill creep hoppers, i.e. hoppers from which piglets feed.

I claim:

1. Apparatus for dispensing flowable material, comprising
   (i) a container for the material, the container having an outlet;
   (ii) a metering dispenser mounted proximate the container outlet for delivering a metered amount of material from the outlet of the container;
   (iii) an ejector having an inlet operatively associated with the dispenser for receiving the metered material substantially centrally thereof and an outlet spaced from the inlet through which the metered material is ejected from the apparatus to a desired location;
   (iv) the ejector comprising a disc-like body, the outlet being peripherally arranged, and there being in the body, means with a plurality of blades, for receiving material from the central inlet and conducting it to and through the outlet.

2. Apparatus as defined in claim 1, further comprising means for removably mounting the ejector in the apparatus.

3. Apparatus as defined in claim 2, wherein the ejector is removably slidably mounted on guide rails proximate the container.

4. Apparatus as defined in claim 1, wherein the ejector outlet is inclined upwardly to the horizontal.

5. Apparatus as defined in claim 4, wherein the ejector includes a spindle rotatable by a motor means adapted for connection with a source of power.

6. Apparatus as defined claim 5, wherein the blades are each stepped to provide a cut-away part adjacent the inlet, and wherein the ejector outlet is substantially tangentially arranged in a wall of the body.

7. Apparatus as defined in claim 1, further comprising a trajectory direction means such as a nozzle mounted at the ejector outlet.

8. Apparatus as defined in claim 7, further comprising an extension conduit means from the ejector outlet for directing feed to a desired location.

9. Apparatus as defined in claim 1, wherein the apparatus is mounted on a mobile chassis.

10. A method of dispensing flowable material, comprising providing material, providing apparatus as defined in claim 1, and ejecting material through the ejector outlet to a desired location.

11. A method as defined in claim 10, wherein there is the step of traversing the apparatus along a fence on one side thereof and ejecting the material over the fence to a desired location on the other side of the fence.

12. A method as defined in claim 11, wherein the length of ejection is varied by varying the speed of the ejector.

* * * * *